United States Patent [19]

Beijen et al.

[11] 4,172,875

[45] Oct. 30, 1979

[54] PRODUCTION OF THINWALLED ARTICLES

[75] Inventors: Johan M. Beijen; Jacques G. Du Chatinier, both of Amsterdam, Netherlands

[73] Assignee: Shell Oil Company, Houston, Tex.

[21] Appl. No.: 890,772

[22] Filed: Mar. 27, 1978

[30] Foreign Application Priority Data

Mar. 30, 1977 [GB] United Kingdom ............... 13387/77

[51] Int. Cl.$^2$ .............................................. B29C 17/04
[52] U.S. Cl. .................................................... 264/550
[58] Field of Search ...................... 264/89, 90, 92, 93, 264/94, 544, 547, 549, 550, 551, 553, 554; 260/897 A

[56] References Cited

U.S. PATENT DOCUMENTS

| | | | |
|---|---|---|---|
| 3,281,501 | 10/1966 | Coats et al. ....................... | 260/897 A |
| 3,358,053 | 12/1967 | Hostetler ...................... | 260/897 A X |
| 3,627,852 | 12/1971 | Aishima et al. ............. | 260/897 A X |

FOREIGN PATENT DOCUMENTS

| | | |
|---|---|---|
| 1569429 | 7/1970 | Fed. Rep. of Germany . |
| 2024342 | 12/1971 | Fed. Rep. of Germany ...... 260/897 A |
| 41-7345 | 4/1966 | Japan ................................... 260/897 A |
| 1139887 | 1/1969 | United Kingdom . |
| 1367338 | 9/1974 | United Kingdom . |

*Primary Examiner*—Jan H. Silbaugh

[57] ABSTRACT

The method of forming thin-walled cupped articles from unpigmented polypropylene sheet by plug-assisted fluid pressure forming of the sheet at a temperature 4° to 15° C. below its melting point is known to produce clear, oriented articles of good impact strength. The low temperature impact strength of these articles can be significantly improved with little or no sacrifice of clarity by making them from sheet produced from a blend of a crystalline propylene polymer with from 1 to 30% of low density polyethylene.

1 Claim, No Drawings

PRODUCTION OF THINWALLED ARTICLES

BACKGROUND OF THE INVENTION

1. Field of the Invention

The invention is concerned with a method of making thin-walled cupped articles from a sheet of polyolefin plastics material and with the cupped articles so made.

2. Description of the Prior Art

It is known from U.K. Specification No. 1,367,338 to make thin-walled cupped articles from a sheet of polyolefin plastics material such as polypropylene, polyethylene, copolymers of such material and similar plastics materials. The method comprises introducing a thin sheet of the polyolefin plastics material in the solid-phase state, i.e. below the crystalline melting point and above the glass transition point, between a forming plug and a mold having an end opening, moving the forming plug into the mold opening with the sheet to carry a bulged portion of the sheet into the mold, and introducing pressure fluid into the bulged portion of the sheet to form the article in the mold.

The above method is particularly suitable for making thin-walled cupped articles of polypropylene or poly(propylene/ethylene) and has met with considerable commercial success. Such articles, if unpigmented, are transparent or clear, especially those made from polypropylene having a melt flow of at least 5. One disadvantage of such articles, especially those made from polypropylene having a melt flow of at least 5, is that the impact strength is low. It is known that the brittleness of polypropylene is reduced by orientation and that low temperature properties of polypropylene can be improved by copolymerization with other olefins, especially polyethylene. Encyclopedia of Polymer Science and Technology, 1969, Vol. 11, page 610). The disadvantage of low impact strength of the articles formed by the above method has been partly overcome by using sheets of polyolefin plastic material prepared from mixtures of polypropylene and poly(propylene/ethylene). These improved articles are commercially available and usually contain about 20%w of the copolymer. Although such copolymers do have a beneficial effect on the impact strength of the articles, there is a need for increasing the low temperature impact strength still further if the articles are to be stored at deep-freeze temperatures. Moreover, articles made from blends of said copolymers with homopolymer have reduced transparency or clarity compared with articles made from propylene homopolymer. This is a disadvantage for many uses of the articles. There is, therefore, a need for a means of increasing further the impact strength of the articles which does not adversely effect, or not to such a large extent, the transparency or clarity thereof.

After development of the present invention, which involves the use of sheet made from blends of propylene polymers with low density polyethylene, the following references were found in a search for related prior art.

U.K. Pat. No. 1,005,333 to Avison discloses that the slip characteristics of oriented polypropylene film can be improved by employing a blend of polypropylene with from 2% to 15% of polyethylene of 0.90–0.95 g/cc density and 0.5–12 melt index.

U.K. Pat. No. 1,139,887 to Union Carbide discloses that film produced from blends of polypropylene with 3 to 15 phr of polyethylene of 0.88 to 0.93 g/cc density and melt index in excess of 25 have better low temperature impact strength than polypropylene homopolymer film, as well as high gloss and low haze.

French Pat. No. 1,562,860 to Ethylene Plastique discloses that films produced from blends of polypropylene with 5–30% of polyethylene of density below 0.94, drawn below the crystalline melt temperature of polypropylene, have better mechanical properties than films correspondingly produced from polypropylene.

SUMMARY OF THE INVENTION

We have now found that articles made from sheets of propylene polymers made from a blend of propylene polymers with 1 to 30 percent by weight of low density polyethylene have improved low temperature impact strength and transparency or clarity, compared with articles made from said blends of polypropylene with poly(propylene/ethylene).

DESCRIPTION OF THE PREFERRED EMBODIMENTS

Accordingly, the present invention is concerned with a method of making thin-walled cupped articles from polyolefin plastics sheet by introducing a thin sheet of polyolefin plastics material in the solid-phase state between a forming plug and a mold having an end opening, moving the forming plug into the mold opening with the sheet to carry a bulged portion of the sheet into the mold, and introducing pressure fluid into the bulged portion of the sheet to form the article in the mold, characterized in that the sheet of polyolefin plastics material is a mixture of polypropylene and/or poly(propylene/ethylene) and low density polyethylene.

The polypropylene and/or poly(propylene/ethylene) which is employed in preparing the thin sheet of polyolefin plastics material suitably has a melt flow (ASTM D 1238) of at least 0.7 and preferably of from 1 to 12. Since articles prepared from polypropylene having a melt flow of at least 5, e.g. from 5, to 11.5, are characterized by having good transparency but poor impact strength, the present invention is particularly useful when the polypropylene has a melt flow in this range. The poly(propylene/ethylene) suitably comprises from 5 to 10%w of ethylene and preferably is a block copolymer.

The low density polyethylene which is employed in preparing the thin sheet of polyolefin plastics material has a density of from 0.915 to 0.94, preferably of from 0.92 to 0.93, and a melt flow (ASTM D 1238) of from 0.1 to 60, preferably of from 1 to 4. Suitably, the thin sheet comprises from 1 to 30%w, preferably from 2 to 8%w, based on the weight of sheet, of low density polyethylene.

The thin sheet of polyolefin plastics material which is used in the method of the present invention may be prepared by any convenient technique. Suitably nibs or granules of the polymers are intimately mixed by dry blending and formed into sheet by extrusion-rolling equipment.

Suitable apparatus for carrying out the method of the present invention is described in detail in U.K. Pat. No. 1,367,338, the content of which is hereby incorporated by reference. The apparatus essentially comprises a heating unit for heating the sheet to the desired temperature and a press unit comprising one or more press elements consisting of a mold and forming plug both having fluid ducts. Transport means such as spiked chains are also provided for transporting the sheet from a storage roll through the heating unit and into the press unit.

The thin sheet introduced between the forming plug and mold is suitably at a temperature of from 4 to 15° C. below its crystalline melting point (167° to 169° C.) and suitably has a thickness of at least about 0.2 mm and less than about 3.2 mm, preferably of from 0.2 to 2.0 mm. The fluid forming pressure is suitably at least 5.5 atmospheres, preferably from 5.5 to 10 atmospheres.

The invention will be illustrated with reference to the following examples. The melt flows refer to ASTM D 1238 values. Unless otherwise stated, percentages in the specification and claims are by weight.

EXAMPLES

Thin-walled cupped articles were made in the manner described in U.K. Specification No. 1,367,338.

The sheets of polyolefin plastics material used were prepared by extruding the polymers described below. In all cases the sheet thicknessess were 0.82 mm.
Sheet A: Polypropylene alone (melt flow 8)
Sheet B: Same polypropylene as used for sheet A+20%w of a poly(propylene/ethylene) having a melt flow of 10.
Sheet C: Same polypropylene as used for sheet A+5%w of low density polyethylene having a density of 0.925 and a melt flow of 2.0.
Sheet D: Same components as used for sheet C, but using 15%w of the low density polyethylene.
Sheet E: Same components as used for sheet C, but using 25%w of the low density polyethylene.

Thin-walled cupped articles were prepared from these sheets at a temperature of 160° C., using a fluid pressure of 6.5 atmospheres, at a rate of 19.5 articles per minute. The weight of the articles was 7.8 (+2%w) g.

The impact strength of the cupped articles was determined as follows. The articles were filled with water and closed with lids, after which they were stored at either 4° C. or 20° C. for about 8 hours. The articles were then dropped onto a stone floor from a height of 1 meter. An articles is considered to have failed the test if it breaks and water escapes therefrom. Twenty articles from each sheet were tested at both temperatures. The results are given in the Table.

The clarity of the articles was rated visually. Articles from sheet A, which were the most transparent, were rated 1 and the articles from sheet B, which were the least transparent, were rated 5. The results are also given in the Table.

TABLE

| Example | Sheet Used | Impact Strength % failures 41° C. | 20° C. | Clarity rating |
|---|---|---|---|---|
| (a) | A | 80 | 100 | 1 |
| (b) | B | 60 | 40 | 5 |
| 1 | C | 40 | 0 | 1 |
| 2 | D | 0 | 0 | 2 |
| 3 | E | 0 | 0 | 3 |

The following additional reference has been noted as prior art.

German Offenlegungsschrift No. 1,569,429 to Veba-Chemical is directed to blends of polypropylene of less than 9% heptane-soluble component with 0.1–50% by weight of high pressure polyethylene of 0.918–0.930 density, to provide a thermoplastic of improved low temperature impact strength, reduced stiffness and good weldability.

What we claim is:

1. In the method of making clear thin-walled cupped articles from crystalline polyolefin thermoplastic polymer sheet which comprises clamping a heated sheet of said thermoplastic material in the solid-phase state between a forming plug and a hollow mold having an end opening, moving the forming plug into the opening to carry the sheet into the mold, and introducing pressure fluid into the bulged portion of the sheet to form said article by making the sheet conform to the shape of the hollow mold, the improvement which comprises employing as said sheet a sheet made from a composition consisting essentially of a mixture of polypropylene or poly(propylene/ethylene) of 0.7–12 melt flow with from 2–8 percent by weight of low density polyethylene of 1–4 melt flow, said sheet being heated to a temperature of from 4° to 15° C. below the crystalling melting point of polypropylene, whereby said articles have low temperature impact resistance and clarity superior to articles formed from the same propylene polymer composition which contains no low density polyethylene.

* * * * *